United States Patent
Kamper et al.

[11] Patent Number: 6,048,555
[45] Date of Patent: Apr. 11, 2000

[54] ULTRASONIC METHOD FOR BONDING FOOD LAYERS

[75] Inventors: Susan L. Kamper, Waconia; Vinod W. Padhye, Maple Grove, both of Minn.

[73] Assignee: General Mills, Inc., Minneapolis, Minn.

[21] Appl. No.: 09/287,769

[22] Filed: Apr. 7, 1999

Related U.S. Application Data

[62] Division of application No. 08/999,695, Feb. 12, 1998, Pat. No. 5,914,140, which is a continuation of application No. 08/329,120, Oct. 10, 1994, abandoned.

[51] Int. Cl.[7] .............................. A21D 6/00; A23L 3/30
[52] U.S. Cl. .................... 426/89; 426/94; 426/238; 426/274; 426/275; 426/502; 426/620; 426/621
[58] Field of Search ............................. 426/89, 94, 274, 426/275, 238, 502, 620, 621

[56] References Cited

U.S. PATENT DOCUMENTS

| | | | |
|---|---|---|---|
| 4,279,932 | 7/1981 | Koshida et al. | 426/94 X |
| 5,063,068 | 11/1991 | Cavanagh | 426/502 X |
| 5,108,772 | 4/1992 | Wilbur | 426/94 X |
| 5,182,123 | 1/1993 | Edo et al. | 426/94 X |
| 5,194,271 | 3/1993 | Yasosky | 426/94 X |
| 5,194,273 | 3/1993 | de Bruijne et al. | 426/94 |
| 5,198,056 | 3/1993 | Stockli et al. | 156/73.1 |
| 5,221,546 | 6/1993 | Moore et al. | 426/502 X |
| 5,228,372 | 7/1993 | Harrop et al. | 83/13 |
| 5,262,193 | 11/1993 | Louks et al. | 427/8 |
| 5,359,996 | 11/1994 | Hood | 604/22 |

FOREIGN PATENT DOCUMENTS

90/11690  10/1990  WIPO ................................. 426/238

OTHER PUBLICATIONS

R. Tudor Roberts, Feb. 15, 1993, *High Intensity Ultrasonics in Food Processing*, Cereal and Industry, No. 4.

Jan. 1990, *Ultrasonic Installation of Insects in Thermoplastic Components*, Trade literature from Sonics & Materials, Inc.

*Primary Examiner*—Arthur L. Corbin
*Attorney, Agent, or Firm*—John A. O'Toole; Douglas J. Taylor

[57] ABSTRACT

A method is provided for bonding together the layers of a laminated food product, such as farinaceous dough layers. The method comprises applying ultrasonic energy (12 kPa–25 kHz, 1,000 to 4,000 watts) to form acoustically created bonds between the food layers. The method is particularly suitable for use in preparing multilayered R-T-E cereal pieces, especially those that are center filled, exhibiting greater seam integrity and reduced leakage of the center filling.

33 Claims, No Drawings

ULTRASONIC METHOD FOR BONDING FOOD LAYERS

CROSS REFERENCE

The present application is a division of U.S. application Ser. No. 08/999,695 filed Feb. 12, 1998, now U.S. Pat. No. 5,914,140 which is a continuation application of U.S. application Ser. No. 08/329,120 filed Oct. 10, 1994, now abandoned.

FIELD OF THE INVENTION

The present invention relates to food products, especially Ready-To-Eat cereals, and to their methods of preparation. More particularly, the present invention relates to food products having acoustic welds and to their ultrasonic methods of preparation.

BACKGROUND OF THE INVENTION

A wide variety of food products have one or more portions that are bonded together. For example, numerous Ready-To-Eat ("R-T-E") or breakfast cereals and snack pieces are in the form of biscuits having an upper and a lower layer. The biscuits can include a center filling, e.g., a fruit paste, or be unfilled. The finished biscuits can be prepared by finish baking, puffing, or other finish drying step, of a cereal pellet or snack half product fabricated having upper and lower layers. These pellets can be fabricated by crimp cutting individual pieces from, for example, two layered cooked dough sheets or continuous dough ribbons fed to a two roller, counter rotating crimp cutter (see, for example, U.S. Pat. No. 5,217,739 entitled Methods For Flipping And Aligning A Dough Sheet issued Jun. 8, 1993). The crimp cutter not only forms a mechanically created seal or bond between the dough layers but also sections the dough sheets into individual pieces. (See also commonly assigned U.S. Ser. No. 014,919 filed Feb. 8, 1993 entitled Device For Crimping and Cutting Dough Ropes which describes a high speed apparatus.)

In another example, two layers of farinaceous doughs for a pizza crust are mechanically bonded together by a docking method which forms numerous pinch bonds or docking points between the dough layers. The docked two dough layers can be deep fat fried to provide a product exhibiting greater crispness upon subsequent oven baking.

While such apparatus and techniques are useful, there can be problems with such methods particularly concerning the strength or integrity of the seal or bond between the food layers formed by conventional mechanical methods.

One problem is that the composition of food layers to be mechanically bonded are limited in composition. High fat levels in the layer materials must be avoided since fat levels in the composition adversely affect seal integrity or bond strength. Also, the moisture content must be carefully controlled. If a cooked cereal dough is too wet, the dough can be sticky and hard to work with. If too dry, while easily handled, the dough may fail to form a seam.

Another problem involves the integrity of the seal or bond especially particularly if there is an intermediate layer, e.g., a fruit paste or a fat based filling. The presence of an intermediate layer, especially when fat based, increases the likelihood that the seal will have imperfections or discontinuities. Forming a continuous seal is even more difficult if either of the cereal dough layers has a high fat and/or moisture content. Breaches in the seal or bond between the outer dough layers can result in leakage of the filling. Filling leakage, of course, is highly undesirable leading not only to diminished consumer acceptance but also to significant manufacturing inconveniences.

Still another problem involves maintaining the bond during subsequent processing. For example, many snack half products are deep fat fried to provide finished products, especially puffed products. Mechanically formed bonds or sealing seams often cannot endure the rigors of deep fat frying especially if fabricated from doughs that expand upon deep fat frying. While this problem is particularly severe in deep fat frying, the problem can also arise in other puffing methods, e.g., fluidized bed hot air heating which can also be used for both finish drying and puffing.

Surprisingly, ultrasonic energy has now been found to be useful in forming a bond or acoustic weld or seal between food layers such as in a laminated cereal pellet for an R-T-E or snack biscuit. The ultrasonic energy can be used in substitution for mechanical compression crimping or docking techniques.

Ultrasonic apparatus and techniques are well known and are commonly employed in a variety of areas, especially in the plastics industry. However, it has been surprisingly discovered that ultrasonic energy can be used in connection with cereal dough processing to realize improved cereal products and methods.

More surprisingly, the bonds or acoustic welds formed in the present food products are remarkably robust. As a result, a wide variety of new and appealing R-T-E cereal or snack shapes or other food pieces can now be created characterized by having at least one acoustic weld between the layers.

Another surprising advantage of the present invention is that employment of ultrasonic energy allows for greater freedom in food layer and filling composition since ultrasonic welding is more tolerant of food composition and condition.

Still another surprising aspect of the present invention is the provision of a bond between two food layers essentially characterized in having a tensile strength to the bond greater than the tensile strength of the materials being bonded. Such an improved strength bond is not believed possible to form using conventional mechanical crimping techniques.

SUMMARY OF THE INVENTION

In its primary method aspect, the present invention resides in methods of forming an acoustically formed bond between two bondable food layers. The method involves the steps of:
A. providing a food base in the form of laminated layers comprising at least a first and a second two bondable food layers in overlaying contact; and B. ultrasonically heating the food base to form at least one ultrasonically formed acoustical bond between the layers to form a bonded laminate.

In another method aspect, the present invention resides in methods of preparing multilayered puffed cereal based food product pieces wherein each piece has at least one acoustic weld. These methods comprise the additional steps of: C. forming the laminate into pieces wherein each piece has at least one acoustic bond, and D. puffing the pieces to form puffed cereal pieces such as R-T-E cereals or grain based snack products.

In its finished product aspect, the present invention resides in dried food product pieces having at least two layers and at least one acoustic weld between the two layers.

In another product aspect, the present invention resides in intermediate food product pieces having at least two layers having at least one bond formed there between wherein the bond is essentially characterized as having a tensile strength greater than the tensile strength of either layer from which the bond is formed.

DETAILED DESCRIPTION OF THE INVENTION

The present invention provides novel methods for bond forming between bondable food layers employing ultrasonic energy. The method steps as well as intermediate and final products having at least one ultrasonic bond are described in detail as follows.

Throughout the specification and claims, percentages are by weight and temperatures are in degrees Fahrenheit unless otherwise indicated.

A. Providing A Laminated Food Base

The present invention involves application of ultrasonic energy to at least two bondable food phases or layers for a sufficient time to form a bond between the food phases. The ultrasonic energy is converted into heat which fuses the layers together to form the acoustic bond.

The starting material for the present methods can be any two layers of food material that can be bonded together by the application of ultrasonic energy, i.e., at least one layer being capable of forming a bond with the other upon rapid spot ultrasonic heating. Generally, the formation of an acoustic bond involves the establishment of a polymeric starch and/or protein heat set structure. Such a bond is referred to herein as an acoustical formed bond or, equivalently herein an "ultrasonic weld."

A wide variety of food materials or compositions can be used herein for the food layers to be bonded together such as potato, fruit, fiber, and, especially, farinaceous doughs.

Particularly suitable for use herein as the bondable layer are farinaceous dough sheets. The doughs from which the sheets are fabricated can be raw, i.e., prepared from water, salt and flour wherein the starch component is ungelatinized or, more preferably, from a cooked cereal dough, i.e., wherein the starch component is gelatinized. Of course, the art is replete with compositions and methods for forming farinaceous doughs and the skilled artisan will have no difficulty selecting suitable compositions and methods for preparing such doughs.

The flour can be supplied by the flours of a variety of cereal grains including, but not limited to, wheat (durum, spring and winter), rye, barley, corn, rice, triticale, amaranth, sorghum, millet, oats, potatoes and mixtures thereof. Most surprisingly, the doughs can additionally comprise whole oat flours. The flours can be whole grain, refined, partially extracted flours and mixtures thereof. The flours or the doughs fabricated therefrom can further comprise pure starch components (e.g., corn starch, potato starch). In certain preferred embodiments, the doughs can be puffable cooked cereal doughs. Puffable doughs generally comprise high levels of starch and low levels of fat and/or fiber fractions.

Surprisingly, if desired, farinaceous doughs useful herein can have a high fat or oil content. By high fat content herein is meant a fat content of 5% or greater. Typically, whole grain doughs have a fat content of 5% or less while doughs prepared from white wheat flour typically are low fat, i.e., less than 2%. With mechanical bond forming, high fat levels, i.e., 5% or greater, are undesirable since the presence of fat adversely affects the strength of the mechanical bond. Added fat or even fabricating cereal doughs from high fat cereal grains such as oats having a native fat content of about 8% are generally unsuitable for use in cereal doughs using mechanical crimping. Previously, oat based doughs were fabricated from defatted oat ingredients and/or comprised low levels of the whole oat ingredient(s). It is therefore surprising that even whole grain oat flour cooked cereal doughs (e.g., 80% or greater whole oat groats, dry basis) can be used herein.

The total fat content, i.e., native fat or oil provided by the flour ingredients, plus added fats or oils, can range from about 0.1% to 35%, preferably about 5% to 15%. The added fat can be supplied by any conventional vegetable or animal fat such as obtained from such common oil sources such as soybean, corn oil, cottonseed, peanut, sunflower, palm, coconut, cocoa, canola, safflower, dairy fat, lard and mixtures thereof. The fats can also be partially or fully hydrogenated. The dairy fat can be provided by pure dairy fat or from butter or cheese.

More surprisingly, the farinaceous dough can vary more widely in moisture content. Mechanical crimping or docking generally requires that the cereal dough moisture content be within narrow ranges for a mechanical bond to be successfully formed, which range will vary depending upon the doughs' other properties such as temperature and constituent materials. In the present invention, the dough moisture can range from about 3% to 40%. Surprisingly, both high moisture doughs as well as low moisture doughs, each of which are difficult to mechanically seam seal can be used herein to form acoustical bonds.

Also surprisingly, the dough temperature can range broadly. Mechanical crimping generally also requires that the dough temperature also be carefully controlled. The dough temperature herein, however, can range from 0° to 120° C. (32° to 248° F.). Preferred for use herein are warm doughs having temperatures ranging from about 30° to 50° C. (86° to 122° F.). Such warm doughs are preferred since less ultrasonic heating is required to form the acoustic bonds. Thus, for a given ultrasonic generator, higher line speeds can be used when warm doughs are employed.

Moreover, surprisingly, the dough age can also vary widely. Dough age is related to other dough attributes such as tackiness and surface stickiness. Conventional mechanical crimping typically requires the cereal dough to be aged to particular specifications so that the tackiness of the dough is controlled in order for a mechanical bond or seam to be formed. Small variations from controlled conditions can adversely affect seam or bond integrity.

Within the above general description, the food layers to be bonded can be compositionally similar or different. For example, for an R-T-E cereal biscuit, one layer can be a whole wheat while the second layer can be a rice flour based cooked cereal dough. Also, while cooked cereal dough layers are used to prepare R-T-E cereal or cereal based snack products (e.g., toaster breakfast pastries, chips), uncooked dough layers can be used for other products, e.g., pizza, filled pasta (e.g., ravioli), filled pizza doughs ("calzones") or burritos. In other variations, the doughs can include a chemical leavening agent or can include a yeast component for bread products. In still other variations, one or more layers or surfaces can be corrugated rather than smooth, especially to provide desired texture attributes in the finished product.

The thickness of the layers to be bonded together can be of any thickness that can be bonded together using ultrasound and can range generally from about 0.5 to 5 mm (0.020 to 0.2 in.). Below 0.5 mm in thickness, dough sheets are difficult to handle and can tear easily. Above 5 mm in thickness, the bonds fabricated by ultrasonic energy can result in pieces that have unacceptably large hard spots. Furthermore, for thicker dough layers (greater than 5 mm) to form bonds could be too long to create for commercial applications. Better results are obtained when each bondable layer ranges from about 1 to 4 mm in thickness and for best results about 1 to 3 mm.

In those embodiments intended for use as an R-T-E cereal, the layers to be bonded comprise cooked cereal dough layers having a thickness of about 0.5 to 2 mm, preferably about 1 to 2 mm, during the processing step. Of course, the final thickness will change modestly as moisture level is reduced or if the layer is subsequently puffed. In certain embodiments, the finished product will comprise an outer shell fabricated from a cooked cereal dough layer(s) that envelopes a hollow center cavity. The center cavity may be hollow or empty. In other variations, the center will be partially or fully filled with an edible food filling. In the preparation of a filled pasta, e.g., ravioli, the exterior shell can be fabricated from an uncooked dough.

Food fillings broadly can be classified into 1) water based fillings (e.g., tomato sauce or paste, bean paste or refried beans, fruit compotes or purees, icings) or 2) fat based fillings (e.g., cheese, peanut butter, cremes, chocolate). In addition to the filling fluid or plastic material, the fillings can additionally include a variety of particulate materials such as nuts, meat pieces, flaked grains, seeds, candies, cheese powder, seasonings, and mixtures thereof. The present invention can be used with fillings that are fluid when heated during the puffing stage.

Surprisingly, both water based and fat based fillings can be employed herein. With mechanical crimping, fillings (particularly those that are fat based) can adversely affect the mechanically formed seam seal between the exterior layers. The seam seals may be discontinuous leading to leakage of the filling. Even if initially continuous, the seam seals may be weak leading to subsequent rupture upon further processing. The leakage problems are compounded when a fat based filling is used in combination with a high fat dough layer. The present methods provide improvements in seam seal strength and integrity and can be used even with fat based fillings or when such fat based fillings are used in combination with high fat dough layers.

In other variations, the products can comprise an intermediate dough layer(s) that divides the center cavity into upper and lower compartments that may be empty, filled or partially filled.

In certain embodiments, especially those used for the preparation of R-T-E cereals or snacks, the dough sheets can be initially supplied in continuous sheets or ribbons which are subsequently cut to form individual pieces. In other variations, e.g., burritos, the dough sheet(s) can be previously formed into individual pieces. In certain variations, two dough sheet pieces are overlaid while in other variations a single sheet piece can be folded or rolled over itself.

B. Forming Acoustic Bonds

The present methods further essentially comprise the step of applying ultrasonic energy to the laminated food base for sufficient times to form at least one ultrasonically formed acoustical bond between the layers to form an acoustically bonded laminate.

Ultrasound useful herein can range from 12 to 100 kHz. Especially useful herein are sound frequencies ranging from about 12 to 50 kHz and preferably about 15 to 25 kHz or 20 to 100 micron ($\mu$m) peak to peak amplitude. Ultrasonic generators capable of generating 1,000 to 4,000 watts have been found to be useful herein. In the range of 12 to 20 kHz, employment of ultrasound may be audible to some.

Suitable equipment for use herein to perform the acoustic bonding step is commercially available. For example, ultrasonic sound generations are available from Sonics and Materials, Inc., Danbury, Conn. A variety of horns are commercially available for directing the ultrasonic energy generated. Horns of different shapes, especially their contact outline that make the horns suitable for seam forming, point bonding, cutting and other applications are available.

In the present acoustic bond forming step, the layers need to be in direct contact with each other during the ultrasonic energy application step. If separated by an interjacent food layer that is unbondable, then the layers can be brought into contact by modest mechanical compression such as about 7 to 700 kPa (1 to 100 psi). This modest level of compression is distinguished from the much higher pressure 7,000 kPa (e.g., 1,000 psi or more) required to mechanically form a seal. The interjacent food layer, if meltable, (such as a fat) can melt during the bonding step and the acoustic welding bonds can be formed.

In some particular applications, the food products so formed are useful without further piece forming or drying steps, for example, filled burritos, pizza rolls, and calzoni sandwiches. The food products are, of course, conventionally frozen, packaged and/or otherwise processed, e.g., dried, to form finished food products. The products exhibit superior bond strength between the bonded layers in comparison to mechanically formed bonds.

Surprisingly, the acoustic bond formed is essentially characterized as having a tensile strength greater than the tensile strength of the layers bonded. That is, the food layer will tear before the acoustic bond will exhibit tensile failure.

The acoustic bond can be either a spot or point bond or can be a continuous or line bond. Acoustic bonds can also be in the form of a plurality of point bonds whether in a regular array or pattern or in a random pattern. Spot acoustic bonds can also range widely in density from about 0.1 to 100 bonds/in$^2$ (0.016 to 16 bonds/cm$^2$). Preferred spot bond densities for docking layers together range from about 1 to 10 bonds/in$^2$ (0.16 to 1.6 bonds/cm$^2$).

In certain variations, the acoustic bond can be in the form of a seam seal continuously surrounding the periphery of a center pocket or cavity. A special advantage is that the seam seal can be in the form of a pattern, e.g., the outline of a recognizable shape or pattern, such as an animal shape. In other embodiments, the seal can be discontinuous, e.g., on only one free edge of a parallelogram shaped piece. The skilled artisan will appreciate that ultrasonically formed bonds can be used to prepare a wide variety of products that upon puffing form three dimensional shapes. For example, a single dough sheet can be folded to form a series of fan style pleats. The folded dough is provided with a single spot acoustic weld in its center bonding together the various layers. Upon puffing, the double fan three-dimensional piece is formed.

Such products whether intended as finished products or as intermediate products for further processing generally range in water activity, $a_w$, from about 0.1 to 0.7 and preferably about 0.3 to 0.7.

The time duration of the ultrasonic energy step is influenced by a variety of factors including the dough sheets' thickness, dough temperature, dough composition including moisture content dimensions of the acoustic bond, sound generator power, and dimensions of the acoustic bond, among others. Generally, however, the time required ranges from about 0.1 to 2 seconds.

The width of the acoustic bond can also range widely depending upon the particular application. Bond widths can range from about 0.5 to 30 mm, preferably about 1 to 10 mm.

Piece Forming

In particular preferred embodiments, the laminated dough sheets with acoustic bond(s) are further processed to form individual pieces. In these embodiments, the present methods additionally comprise the step of forming the laminate into pieces wherein each piece has at least one acoustic bond.

If desired, the ultrasonic energy application can be used to additionally ultrasonically cut or sever in addition to bonding together the layers. The ultrasonic cutting can be simultaneous to bond forming or can be practiced at a different time or processing station. In such variations, the ultrasonic energy is used not only to form an acoustic bond but also to perform wholly or partially the forming of individual pieces. However, to sever in addition to bonding could require more intensive or longer acoustic treatment which can slow manufacturing. As a result, preferred method embodiments herein comprise mechanical cutting to form individual pieces (e.g., water knife, cutting rolls, stamping, reciprocating or rotating blades) or other suitable piece forming mechanical techniques.

Finish Drying

In preferred embodiments, the present methods further comprise reducing the moisture content of the individual pieces having at least one ultrasonically formed weld to form either half products or finished products.

In the preparation of puffed snack products, frequently, an unpuffed, shelf stable but puffable half product is formed. The half product has sufficient moisture to be puffable upon further processing, but the moisture content has been reduced sufficiently to tender the half product shelf stable. Shipping a half product allows for their inexpensive production at a single large scale facility and reductions in shipping costs and shipping breakage due to the high volume and fragility of the finished products. Half products can range from about 5% to 40% moisture and water activities, ("$a_w$"), of about 0.3 to 0.7.

The intermediate or half products can also be finish dried by any suitable method including common techniques such as baking, convection air drying, deep fat frying, gun puffing, fluidized bed hot air puffing. Finished R-T-E cereals or snack products have a final moisture content of about 1% to 5% ($a_w$ of about 0.1 to 0.5).

The finished products exhibit exceptionally robust bonds and/or seals between the cereal dough layers. Other finished product attributes include greater seam integrity and thus reductions in leakage of the filling. The present acoustic bonds exhibit increased robustness compared to mechanically formed seams. The acoustic bonds exhibit less failure during puffing. The present acoustic bonds find application in both dry or crispy, crunchy final products as well as with more moist intermediate moisture products.

Industrial Applicability

The present methods find particular suitability for use in the preparation of ready-to-eat cereals and cereal based snack products.

EXAMPLE 1

A three-layer R-T-E cereal product having an acoustic weld of the present invention was prepared.

Puffable cooked cereal doughs (15% moisture) of the following three compositions were developed:

| Ingredient | Weight % |
|---|---|
| Corn meal | 70 |
| Rice flour | 18 |
| Salt | 2 |
| Monoglyceride | 1 |
| Corn flour | 9 |
| | 100% |
| Degermed corn | 45 |
| Wheat flour | 25 |
| Sugar | 21 |
| Wheat starch | 5 |
| Soybean oil | 3 |
| Salt | 1 |
| | 100% |
| Potato flour | 50 |
| Rice flour | 30 |
| Corn starch | 12 |
| Sugar | 5 |
| Soybean oil | 3 |
| | 100% |

The doughs were sheeted to 1 mm (0.040 inch) thickness and formed into a three layer laminate of overlaying layers. The laminate dough sheets were one-fourth inch ultrasonically welded together using a six inch by one-fourth inch (150×6 mm) rectangular horn with about 12 kHz frequency using a (Model ET) ultrasound generator from Sonics & Materials. Weld time was one second with a cool-down time of about three seconds. The ultrasonic step also cut individual pieces from the dough sheet to form pellets having a peripheral seam acoustic weld.

The multilayered welded pellets were puffed using a high intensity microwave heating oven to form a finished puffed cereal. The finished puffed product was suitable for use as a ready-to-eat cereal. The finished product exhibited delamination except in their periphery where the acoustic weld bonded the layers thereby forming a pillow or biscuit.

EXAMPLE 2

A center filled R-T-E cereal product having a fat based filling of the present invention having an acoustic weld was prepared.

Dough of the following composition was sheeted to 1 mm (0.040 inch) thickness. Circular discs of ¾ inch (19 mm) diameter or square sheets with about ¾ inch (19 mm) sides were cut. Up to about two grams of a filling material with the following formula was placed in the center of the cut pieces and sandwiched with another cereal dough piece to form a laminate. The laminate pieces were sealed along its edges using a 2 inch (5 cm) circular horn and ultrasonically sealed at 20 kHz. The half product was dried to 15% moisture and puffed in a high intensity microwave oven.

| Ingredient | Weight % |
|---|---|
| Dough | |
| Corn meal | 75 |
| Rice flour | 22 |
| Salt | 2 |
| Monoglyceride | 1 |
| | 100% |
| Filling: White Confection | |
| Fat | 35.6 |
| Sugar | 51.3 |
| Water | 1.5 |
| Protein | 9.3 |
| Cinnamon powder | 2.3 |
| | 100.0% |

The finished product had intense cinnamon butter fried flavor.

EXAMPLE 3

A center filled R-T-E cereal product of the present invention was prepared similar to that of Example 2 except an ultrasonic horn having a peripheral shape in the outline form of a bear was used. The individual pieces formed had a bear figurine shape.

EXAMPLE 4

An R-T-E cereal product of the present invention was prepared. A sheet of cereal dough of the composition of Example 2 was mechanically cut into 37 mm by 1.8 mm (1½ inch×¾ inch) pieces. A rectangular piece of similar size of commercially available dehydrated fruit puree was placed on it.

This piece was formed into a bow shape by folding the laminate alternately in a fan pattern and a center pinch point was ultrasonically welded between the multiple layers of fruit and dough. The product was further dried to a chewy texture. The center pinch point withstood the drying operation.

What is claimed is:

1. A method for securing food sheets together, comprising the steps of:
   A. providing a food base in the form of laminated layers comprising at least a first layer and a second layer in overlaying contact;
   B. ultrasonically heating the food base to form at least one ultrasonically formed acoustical bond between the layers to form a bonded laminate, wherein the acoustical bond has a tensile strength greater than the tensile strength of either of the bonded layers.

2. The method of claim 1 wherein the bond is in the form of a continuous strip.

3. The method of claim 1 wherein the bond is in the form of a point.

4. The method of claim 1 wherein at least one food layer has a fat content of about 0.1% to 35%.

5. The method of claim 1 wherein step A is practiced with compression between the layers ranging from about 70 to 700 kilopascals (1 to 100 psi).

6. The method of claim 5 wherein at least one layer is fabricated from a farinaceous dough having a moisture content of about 3% to 40%.

7. The method of claim 6 wherein the farinaceous dough is a cooked cereal dough.

8. The method of claim 7 additionally comprising the step of:
   C. forming the laminate into pieces wherein each piece has at least one acoustic bond; and
   D. drying the pieces to a final moisture content of about 2% to 15%.

9. The method of claim 8 wherein in step D the pieces are dried to a final moisture content of about 2% to 5%.

10. The method of claim 9 wherein step C comprises mechanically severing the laminate into pieces.

11. The method of claim 9 wherein the ultrasonic heating step is practiced to form a seam seal and to sever the food base into pieces.

12. The method of claim 11 wherein the drying step comprises a puffing step to form a puffed R-T-E cereal having an acoustic seam seal.

13. The method of claim 12 wherein step B is practiced under compression.

14. The method of claim 6 wherein the farinaceous dough is a raw uncooked cereal dough.

15. The method of claim 6 wherein at least a portion of the laminated layers has a filling disposed therebetween.

16. The method of claim 15 wherein step B is practiced using ultrasound having a frequency of about 12 to 100 kHz.

17. The method of claim 16 wherein step B is practiced using ultrasound having a frequency of about 15 to 25 kHz.

18. The method of claim 15 wherein at least one acoustical bond forms a seam seal for the filling.

19. The method of claim 18 wherein the filling includes a fat ingredient.

20. The method of claim 1 wherein the ultrasonic heating provides a multiplicity of bonds.

21. The food prepared from the method of claim 1.

22. A method for preparing a puffed multilayered R-T-E cereal comprising the steps of:
   A. providing a food base in the form of laminated layers comprising at least a first farinaceous dough food layer and a second farinaceous dough food layer in overlaying contact;
   B. ultrasonically heating the food base under compression to form at least one ultrasonically formed acoustic bond between the layers to form a bonded laminate, wherein the acoustic bond has a tensile strength greater than the tensile strength of either of the bonded layers;
   C. forming the laminate into pieces having at least one free edge wherein each piece has at least one acoustic bond; and
   D. puffing the pieces to form puffed R-T-E cereal pieces, wherein each piece has at least one acoustic bond.

23. The method of claim 22 wherein at least one layer is fabricated from a cooked farinaceous dough having a moisture content of about 3% to 40%.

24. The method of claim 23 wherein at least one layer is fabricated from a cooked cereal dough having a fat content of about 0.1% to 35%.

25. The method of claim 24 wherein the acoustic bond forms a peripheral seam on at least one free edge of each piece.

26. The method of claim 25 wherein step B is practiced using ultrasound having a frequency of about 12 to 100 kHz.

27. The method of claim 26 wherein the pieces are in biscuit form and wherein the acoustic bond is in the form of a continuous peripheral seam seal to form sealed biscuit pieces.

28. The method of claim 27 wherein the biscuit pieces include a center filling.

29. The method of claim 28 wherein the center filling is fruit based.

30. The method of claim 29 wherein each piece has a periphery in the form of a figurine.

31. The method of claim 29 wherein at least one layer is fabricated from a whole oat cooked cereal dough.

32. The method of claim 28 wherein the center filling includes about 5% to 50%, by weight of the filling, of a fat ingredient.

33. The food product prepared from the method of claim 22.

* * * * *